United States Patent
Espinosa-Loza et al.

(10) Patent No.: US 9,057,483 B2
(45) Date of Patent: Jun. 16, 2015

(54) THREADED INSERT FOR COMPACT CRYOGENIC-CAPABLE PRESSURE VESSELS

(71) Applicant: Lawrence Livermore National Security, LLC, Livermore, CA (US)

(72) Inventors: Francisco Espinosa-Loza, Livermore, CA (US); Timothy O. Ross, Patterson, CA (US); Vernon A. Switzer, Livermore, CA (US); Salvador M. Aceves, Livermore, CA (US); Nicholas J. Killingsworth, Pleasanton, CA (US); Elias Ledesma-Orozco, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 0 days.

(21) Appl. No.: 14/179,398

(22) Filed: Feb. 12, 2014

(65) Prior Publication Data
US 2014/0263358 A1 Sep. 18, 2014

Related U.S. Application Data

(60) Provisional application No. 61/802,247, filed on Mar. 15, 2013.

(51) Int. Cl.
*F17C 13/06* (2006.01)
*F17C 13/00* (2006.01)

(52) U.S. Cl.
CPC .............. *F17C 13/00* (2013.01); *F17C 13/06* (2013.01)

(58) Field of Classification Search
CPC ...... F17C 1/00; F17C 1/02; F17C 2205/0311; F17C 2205/0302; F17C 2205/03

USPC ................... 220/586, 582, 612, 581
See application file for complete search history.

(56) References Cited

U.S. PATENT DOCUMENTS

| | | | | |
|---|---|---|---|---|
| 2,507,778 | A * | 5/1950 | Frey ............................ | 220/585 |
| 2,652,943 | A * | 9/1953 | Williams ..................... | 220/586 |
| 3,505,039 | A * | 4/1970 | Roberts et al. ............... | 138/145 |
| 4,625,753 | A | 12/1986 | Gustafson | |
| 6,015,065 | A * | 1/2000 | McAlister .................... | 220/586 |
| 6,186,356 | B1 * | 2/2001 | Berkley et al. ............... | 220/582 |
| 6,290,088 | B1 * | 9/2001 | Zdunek et al. ............... | 220/586 |
| 6,357,238 | B1 | 3/2002 | Brothers | |

(Continued)

FOREIGN PATENT DOCUMENTS

EP 2466186 6/2012

OTHER PUBLICATIONS

International Search Report and Written Opinion for PCT/US2014/023992 related to U.S. Appl. No. 14/179,398, 15 pages.

*Primary Examiner* — Fenn Mathew
*Assistant Examiner* — Chetan Chandra
(74) *Attorney, Agent, or Firm* — Eddie E. Scott (57) ABSTRACT

An insert for a cryogenic capable pressure vessel for storage of hydrogen or other cryogenic gases at high pressure. The insert provides the interface between a tank and internal and external components of the tank system. The insert can be used with tanks with any or all combinations of cryogenic, high pressure, and highly diffusive fluids. The insert can be threaded into the neck of a tank with an inner liner. The threads withstand the majority of the stress when the fluid inside the tank that is under pressure.

4 Claims, 5 Drawing Sheets

(56) References Cited

U.S. PATENT DOCUMENTS

| | | | |
|---|---|---|---|
| 6,708,502 B1 * | 3/2004 | Aceves et al. | 62/45.1 |
| 6,983,611 B2 | 1/2006 | Reese | |
| 7,021,488 B2 * | 4/2006 | Thompson | 220/586 |
| 7,032,768 B2 * | 4/2006 | Felbaum | 220/582 |
| 7,191,602 B2 | 3/2007 | Berry et al. | |
| 8,397,938 B2 * | 3/2013 | Strack | 220/586 |
| 8,464,893 B2 * | 6/2013 | Iida et al. | 220/590 |
| 2003/0189053 A1 * | 10/2003 | Felbaum | 220/582 |
| 2009/0071965 A1 * | 3/2009 | Iida et al. | 220/586 |
| 2009/0200318 A1 * | 8/2009 | Handa | 220/586 |
| 2010/0126999 A1 * | 5/2010 | Kleber et al. | 220/582 |
| 2011/0220661 A1 * | 9/2011 | Strack | 220/586 |

* cited by examiner

THREADED INSERT FOR COMPACT CRYOGENIC-CAPABLE PRESSURE VESSELS

CROSS-REFERENCE TO RELATED APPLICATIONS

This application claims benefit under 35 U.S.C. §119(e) of U.S. Provisional Patent Application No. 61/802,247 filed Mar. 15, 2013 entitled "Innovative Insert Design for Compact Cryogenic Capable Pressure Vessels," the disclosure of which is hereby incorporated by reference in its entirety for all purposes.

STATEMENT AS TO RIGHTS TO INVENTIONS MADE UNDER FEDERALLY SPONSORED RESEARCH AND DEVELOPMENT

The United States Government has rights in this invention pursuant to Contract No. DE-AC52-07NA27344 between the United States Department of Energy and Lawrence Livermore National Security, LLC for the operation of Lawrence Livermore National Laboratory.

BACKGROUND

1. Field of Endeavor

The present invention relates to compact cryogenic-capable pressure vessels and more particularly to a threaded insert for compact cryogenic-capable pressure vessels.

2. State of Technology

Hydrogen has the potential to displace petroleum as a universal transportation fuel, reducing or eliminating petroleum dependence and associated tailpipe air pollutants and greenhouse gases. The predominant technical barrier limiting widespread use of hydrogen vehicles is sufficient onboard fuel storage capacity for highway vehicles within volume, weight, cost, and refueling time constraints.

There exist three technologies for automotive hydrogen storage: High pressure compressed gas storage, low-pressure absorption of hydrogen in porous and/or reactive materials, and storage as a cryogenic liquid. Each has significant fundamental drawbacks. Hydrogen stored as a compressed gas occupies a relatively large volume at ambient temperature. Materials which absorb hydrogen add significant weight, cost, and thermal complexity to onboard storage systems. Liquid hydrogen ($LH_2$) storage has the potential for evaporative losses from distribution, transfer and refueling operations, in addition to pressure buildup due to heat transfer, which must be relieved by venting during periods of inactivity greater than several clays.

Over the past 10 years the Applicants have pioneered research and development of a more advantageous storage technology: cryogenic capable pressure vessels. This technology can store hydrogen more compactly than conventional ambient temperature pressure vessels, with lower weight than hydrogen absorption storage technologies, and with far greater thermal endurance than conventional low pressure $LH_2$ storage, potentially eliminating evaporative losses under virtually all automotive usage conditions.

The subcomponents of such tanks must also be able to handle high pressure cryogenic conditions. However, most components are designed for only one specific subset such as low pressure cryogenic or high pressure and ambient temperatures and therefore cannot be used. Furthermore, conventional approaches to interface the tank with external components designed for high pressure cryogenic conditions take up a large amount of the system volume. Considering that storing enough hydrogen onboard a vehicle is key for customer acceptance, compact pressure vessel system designs will play an important role in enabling a transition to clean, practical, hydrogen vehicles.

SUMMARY

Features and advantages of the present invention will become apparent from the following description. Applicants are providing this description, which includes drawings and examples of specific embodiments, to give a broad representation of the invention. Various changes and modifications within the spirit and scope of the invention will become apparent to those skilled in the art from this description and by practice of the invention. The scope of the invention is not intended to be limited to the particular forms disclosed and the invention covers all modifications, equivalents, and alternatives falling within the spirit and scope of the invention as defined by the claims.

Generally, the present invention is directed to an insert for a cryogenic capable pressure vessel for storage of hydrogen or other cryogenic gases at high pressure. The insert enables compact cryogenic pressure vessel designs necessary for practical hydrogen fueled vehicles. The insert is the interface between a tank and internal and external components of the tank system. The design outlined here can be used with tanks with any or all combinations of cryogenic high pressure, and highly diffusive fluids. The insert can be threaded into the neck of a tank with an inner liner. The threads withstand the majority of the stress when the fluid inside the tank that is under pressure. The insert is joined to the tank providing a seal to contain highly diffusive molecules such as hydrogen that can leak through the threads. External components can be attached by joining them to the insert. This combination of a threaded body that is joined at the top edge to the tank and at the inner face to the exterior components allows the insert to be used in a tank exposed to the spectrum of cryogenic to ambient temperatures, as well as high pressure fluids. The insert can be constructed of two materials to accommodate joining to a tank constructed of a different material than the external components. Placing the insert inside the neck of the tank reduces the total volume of the container system.

The present invention is especially well suited for use in hydrogen storage vessels for hydrogen powered vehicles where the invention aids in reducing the system volume of the onboard storage vessel of hydrogen fuel. The insert can be used in vessels that can be filled with compressed hydrogen at ambient temperature as well as any lower temperature, including temperatures at which hydrogen liquefies. Cryogenic capable high pressure vessels also reduce or eliminate evaporative losses (a perennial problem with cryogenic tanks) for the vast majority of likely vehicle use patterns.

The invention is susceptible to modifications and alternative forms. Specific embodiments are shown by way of example. It is to be understood that the invention is not limited to the particular forms disclosed. The invention covers all modifications, equivalents, and alternatives falling within the spirit and scope of the invention as defined by the claims.

BRIEF DESCRIPTION OF THE DRAWINGS

The accompanying drawings, which are incorporated into and constitute a part of the specification, illustrate specific embodiments of the invention and, together with the general description of the invention given above, and the detailed description of the specific embodiments, serve to explain the principles of the invention.

DETAILED DESCRIPTION OF SPECIFIC EMBODIMENTS

Referring to the drawings, to the following detailed description, and to incorporated materials, detailed information about the invention is provided including the description of specific embodiments. The detailed description serves to explain the principles of the invention. The invention is susceptible to modifications and alternative forms. The invention is not limited to the particular forms disclosed. The invention covers all modifications, equivalents, and alternatives falling within the spirit and scope of the invention as defined by the claims.

The invention provides a compact insert for a cryogenic capable pressure vessel for storage of cryogenic liquid gas, cryogenic compressed gas, or compressed gas at ambient temperature. The invention consists of a threaded insert for a tank with an inner liner, with the insert joined to the tank (e.g., by welding) to form a seal that will contain highly diffusive gases such as hydrogen. The insert is a component of a compact hydrogen storage system for the automotive market. The system is more compact than competing designs, and can be used for storage of any combination of cryogenic, ambient temperature, and high pressure hydrogen.

Referring now to the drawings, embodiments of a threaded insert for compact cryogenic-capable pressure vessels are illustrated in FIGS. 1, 2A, 2B, 2C, and 3. Generally, the present invention is directed to an insert for a cryogenic capable pressure vessel for storage of hydrogen or other cryogenic gases at high pressure. The insert enables compact cryogenic pressure vessel designs necessary for practical hydrogen fueled vehicles. The insert is the interface between a tank and internal and external components of the tank system. The present invention provides an insert that can be threaded into the neck of a tank with an inner liner. The threads withstand the majority of the stress when the fluid inside the tank is under pressure. The insert is then joined to the tank providing a seal to contain highly diffusive molecules such as hydrogen that can leak through the threads. External components can be attached by joining them to the insert. This combination of a threaded body that is joined at the top edge to the tank and at the inner face to the exterior components allows the insert to be used in a tank exposed to the spectrum of cryogenic to ambient temperatures, as well as high pressure fluids. This insert can be constructed of two materials to accommodate joining to a tank constructed of a different material than the external components. Placing the insert inside the neck of the tank reduces the total volume of the container system.

Figure 1:
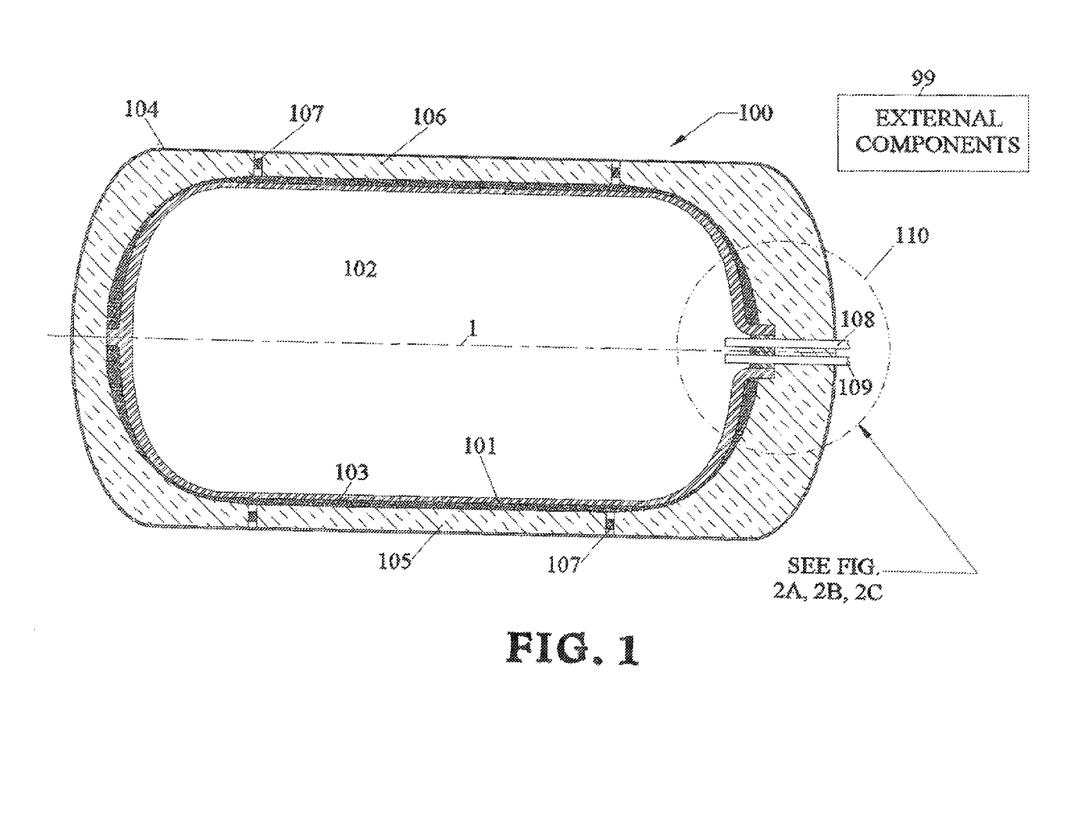
FIG. 1 illustrates embodiments of a cryogenic-compatible pressure vessel of the present invention.

Referring now to FIG. 1, a longitudinal cross-sectional view of a cryogenic-compatible pressure vessel 100 is shown. An insert of the present invention, is located within the area designated by the dotted line circle 110. The insert 110 provides access into and out of the storage volume 102 of the pressure vessel 100. The insert 110 includes an inlet port 108 and an outlet port 109 extending through the inner pressure container 103 and the outer container 104. The inlet port 108 and an outlet port 109 provide access into and out of the storage volume 102 of the pressure vessel 100. The inlet port 108 and an outlet port 109 provide a connection to external components 99.

A central axis 1 extends along the pressure vessel 100. The pressure vessel 100 generally has an elongated cylindrical configuration along the central axis 1 with rounded elliptical hemispherical ends, as is typical of pressure vessel design in the art. Furthermore, the pressure vessel 100 includes an inner pressure container 103 surrounding and enclosing a storage volume 102, and an outer container 104 surrounding the inner pressure container 103 to form an evacuated space 105 there between. Insulated cross supports 107 separate and suspend the inner pressure container 103 from the outer container 104, to reduce heat conduction there between.

The various embodiment of the insert 110 provides access into and out of the storage volume 102 through the inlet port 108 and the outlet port 109 extending through the inner pressure container 103 and the outer container 104. It is to be understood that although two ports, 108 & 109, are shown; a single tube or any number of multiple tubes can be used. The various embodiments of the insert 110 provide connection to the external components 99 through the inlet port 108 and the outlet port 109. The outer container 104 has a lightweight rigid body construction capable of supporting the evacuated space 105 therein, with aluminum or stainless steel being exemplary material types used for its construction.

Given that weight is of critical importance in pressure vessels, especially for vehicular applications, the inner pressure container 103 is a lightweight rigid structure having a high strength-to-weight ratio. Moreover, the construction of the inner pressure container 103 is configured to withstand high pressures (due to compressed gas storage) from within the fuel storage volume 102. For example, light-duty vehicular storage applications using compressed gas fuels may typically have operating pressures up to 10000 psi when storing 5 kg of $H_2$ in a 250 liter external volume. In any case, the inner pressure container 103 is typically made from a lightweight composite material having a fiber reinforced resin matrix construction, using manufacturing methods known in the art. Composite constructions, such as carbon-fiber, fiber-epoxy, the composite material sold under the trademark "Kevlar," etc., provide numerous advantages such as lightness in weight and resistance to corrosion, fatigue and catastrophic failure. This combination of lightness in weight and resistance to failure is possible due to the high specific strength of the reinforcing fibers or filaments (carbon, glass, aramid, etc.) which, in the construction of pressure vessels, is typically oriented in the direction of the principal stresses.

As shown in FIG. 1, the inner pressure container 103 may additionally include an inner liner 101 which lines the inside surface thereof. The inner container liner 101 is typically made of metals such as aluminum and steel, although it may also be composed of a lightweight non-metallic material, such as a polymeric material, in order to achieve substantial weight reduction of the pressure vessel (compared to metallic liners commonly used for conventional pressure vessels). Exemplary polymeric materials include polyethylene, nylon, kapton, or other polymers, but are not limited only to such. The substantial weight reduction provided by using a polymeric liner instead of an aluminum liner can be appreciated by the potential weight savings of 10-15 kg for a 3540 kg total vessel mass in the 5 kg $H.sub.2$/250 liter pressure vessel example discussed above (where the aluminum liner has an approximate average thickness of 3 mm). Where an inner liner is used, construction of the composite-construction inner pressure container typically involves wrapping fibers over the liner in order to produce the fiber reinforced resin matrix. However, in the case of a composite inner vessel sans inner liner, fabrication of the inner container 103 typically involves a water-soluble or otherwise removable mandrel. In any case, the plastic liner 101 and the composite inner pressure container 103 are selected and designed for suitable operation over a wide range of temperatures, from liquid hydrogen temperatures (20 K) up to high temperatures that may result while the vessel is filled with compressed hydrogen (up to 400 K).

As shown in FIG. 1, the pressure vessel 100 also includes a thermal insulator 106 surrounding the inner pressure container 103 in the evacuated space 105. The thermal insulator 106 serves to inhibit heat transfer to the storage volume 102. One exemplary embodiment of the thermal insulator comprises an external vacuum multi-layer insulation to reduce heat transfer to the storage volume, especially during cryogenic operation. The outer container 104 operates to keep a vacuum around the vessel, which is required for effective operation of the multi-layer insulation. In an exemplary embodiment, the pressure vessel is insulated with multilayer vacuum superinsulation (MLVSI). MLVSI exhibits good thermal performance only under a high vacuum, at a pressure lower than 0.01 Pa (7.5.times.10(-5) mm Hg).

The present invention is directed to a lightweight, cryogenic-compatible pressure vessel capable of flexibly storing fluids, such as cryogenic liquids as well as compressed gases, at cryogenic or ambient temperatures. For fuel storage applications, such as for alternative fuel vehicles (AFV), the pressure vessel is designed to store cryogenic liquid fuels, (e.g. liquid hydrogen, "$LH_2$", or liquid natural gas, "LNG"), and compressed gas fuels at cryogenic or ambient temperatures (e.g. compressed hydrogen, "$CH_2$", or compressed natural gas, "CNG").

While hydrogen and natural gas are two of the more common examples of alternative fuels used for AIN applications, other fuels may also be utilized which are suitable for compressed gas storage and cryogenic liquid storage. In the present discussion, hydrogen is used as an exemplary fuel for generally illustrating operation of the present invention. Additionally, while the advantages of a cryogenic-compatible pressure vessel are readily apparent for vehicular storage applications, it is not limited only to such. The present invention may be generally used for any application requiring flexibility in the types of fluids stored cryogenic and compressed.

Figure 2A:
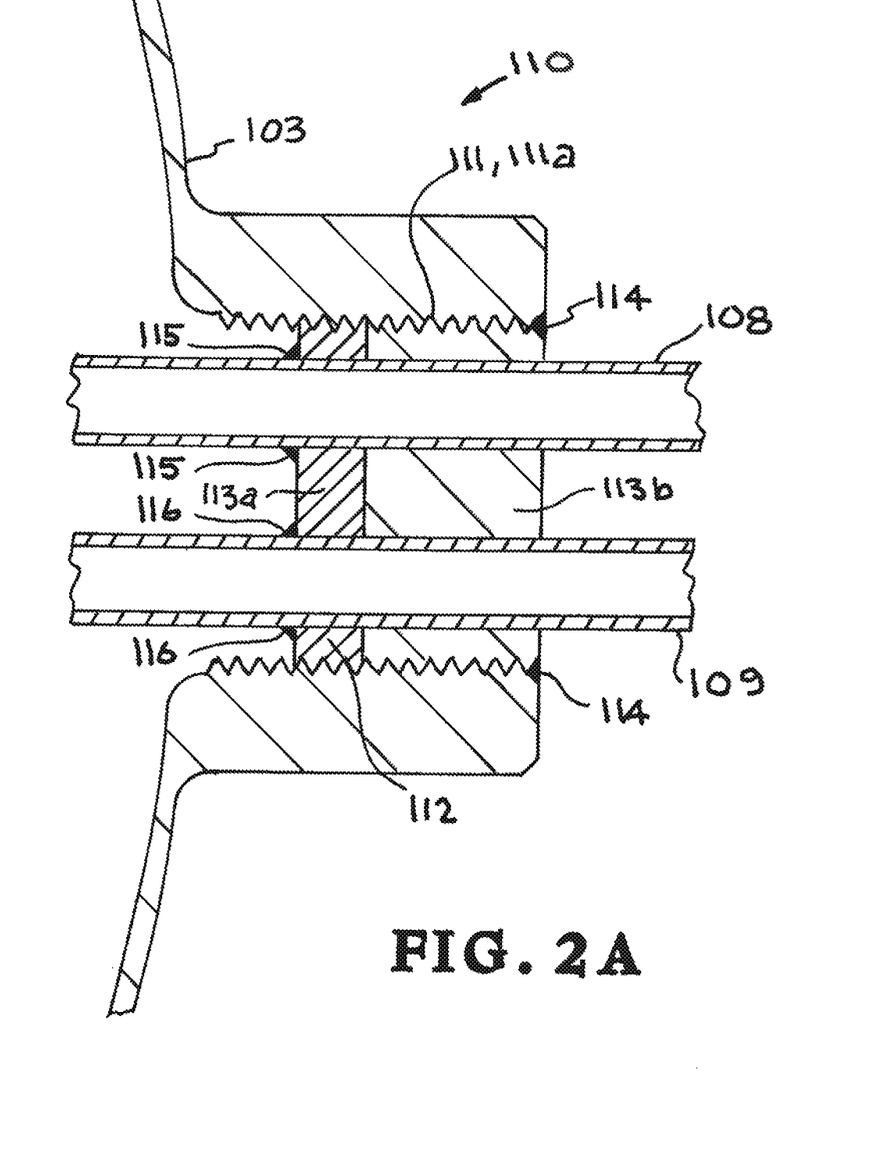
FIGS. 2A, 2B, and 2C illustrate one embodiment of a cryogenic-compatible pressure vessel of the present invention.

Referring now to FIG. 2A, one embodiment of an insert for a cryogenic-compatible pressure vessel constructed in accordance with the present invention is illustrated. This embodiment of an insert for a cryogenic-compatible pressure vessel is designated generally by the reference numeral 110. The insert 110 provides access into and out of the storage volume 102 of the pressure vessel 100 illustrated in FIG. 1 through inlet port 108 and outlet port 109. The inlet port 108 and outlet port 109 provide a connection to external components 99 as illustrated in FIG. 1.

FIG. 2A shows the insert 110 threaded into the neck of inner container 103. In this example, threads 111, 111a are formed in the container and insert component 113a, 113b. The inlet port 108 and an outlet port 109 are shown in the form of inlet port tube 108 and an outlet port tube 109. The threads 111 and 112 withstand the majority of the stress when the fluid inside the tank is pressurized.

The insert 110 includes an insert component 113a, 113b joined to the inner container 103 through threads 111, 111a. The tank 103 is welded to the outer surface of the insert component 113a, 113b by the weld 114 that extends around the circumference of the insert component 113a, 113b and threads 111 and 111a as depicted in FIG. 2A. The weld 114 provides a seal to contain highly diffusive molecules such as hydrogen that can leak through the threads 111 and 112.

The inlet port tube 108 and the outlet port tube 109 extend through the insert component 113a, 113b. As shown in FIG. 2A the inlet port tube 108 and the outlet port tube 109 are welded to the insert component 113a, 113b by welds 115 and 116. The weld 115 extends circumferentially around inlet port tube 108. The weld 116 extends circumferentially around outlet port tube 109. This combination of a threaded body that is joined at the top edge and inner face allows the insert to be used in a tank exposed to the spectrum of cryogenic to ambient temperatures, as well as, high pressure fluids. This design has the advantage of reducing the stress at the joint between the insert and the tank because of the use of threads.

The majority of standard pressure vessels has threaded bosses and can therefore be used with this insert. Additionally, placing the insert inside the neck of the tank is especially advantageous for tanks surrounded by a vacuum jacket or insulation. Use of this insert substantially reduces the volume required to encapsulate the inner pressure container versus a traditional feed through that protrudes out of the container's neck.

The insert 113a, 113b can be constructed of two materials to accommodate joining to a tank constructed of a different material than the external components. For example, if an aluminum-lined, carbon fiber-wrapped tank is used with stainless steel components (tubing, etc.) the insert can be machined from one piece of aluminum explosion welded, to stainless steel. The aluminum half of the insert can then be welded to the aluminum tank liner 114 and the stainless steel tubes that connect the fluid inside the tank to the outside world can be welded to the inner stainless steel face 115, 116. Many variations of the insert mentioned here exist. FIG. 2C shows two holes bored through the insert. However, any number of holes or passages can be machined into the insert. Additionally, slots can be added to the threads to relieve the potential pressure created when cryogenic fluids such as liquid hydrogen are trapped between the threads and undergo a temperature change. In FIG. 2A two slots are shown, but the number will likely change for different fluids contained in the tank, as well as for different diameter inserts. For cases when two materials with different coefficients of thermal expansions make up the bi-material insert, the body of the insert can be partially threaded. Partially threading the insert can reduce the stress and wear on the threads of both the insert and the tanks boss when the tank system undergoes thermal cycling.

Figure 2B:
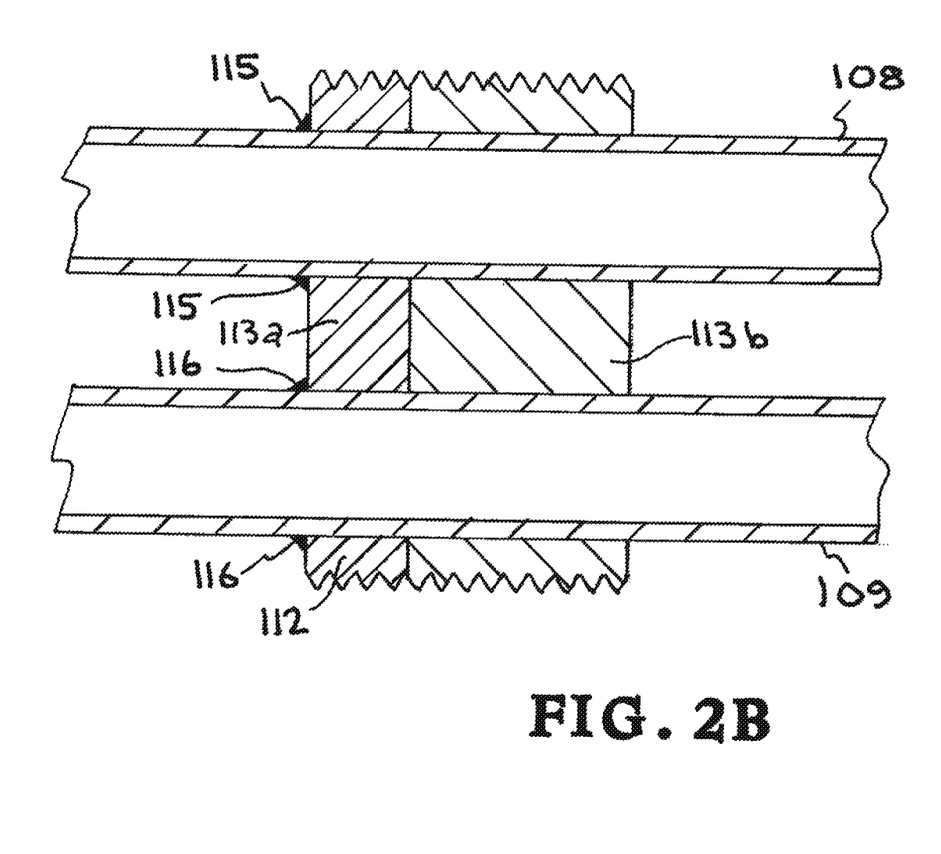
Figure 2C:
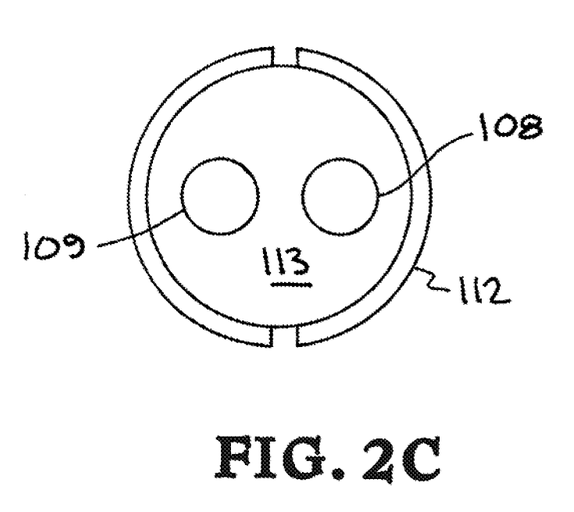

FIG. 2B, is an enlarged view of the insert component 113a, 113b illustrated in FIGS. 1 and 2A. FIG. 2B shows the inlet port 108 and the outlet port 109 in the form of inlet port tube 108 and an outlet port tube 109 extending through insert component 113a, 113b. As shown in FIG. 2B the inlet port tube 108 and the outlet port tube 109 are welded to the insert component 113a, 113b by welds 115 and 116. The weld 115 extends circumferentially around inlet port tube 108. The weld 116 extends circumferentially around outlet port tube 109. This combination of a threaded body that is joined at the top edge and inner face allows the insert to be used in a tank exposed to the spectrum of cryogenic to ambient temperatures, as well as, high pressure fluids. This design has the advantage of reducing the stress at the joint between the insert and the tank because of the use of threads.

FIG. 2C, is a cut away view of the insert component 113a, 113b illustrated in FIGS. 1, 2A, and 2B. FIG. 2B shows that the inlet port tube 108 and an outlet port tube 109 extend through the insert component 113a, 113b. As shown in FIG. 2C the insert component has the threads 112 that extend circumferentially around the insert component 113a, 113b. The inlet port tube 108 and an outlet port tube 109 are welded to the insert component 113a, 113b. This combination of a threaded body that is joined at the top edge and inner face allows the insert to be used in a tank exposed to the spectrum of cryogenic to ambient temperatures, as well as, high pressure fluids. This design has the advantage of reducing the stress at the joint between the insert and the tank because of the use of threads.

Figure 3:
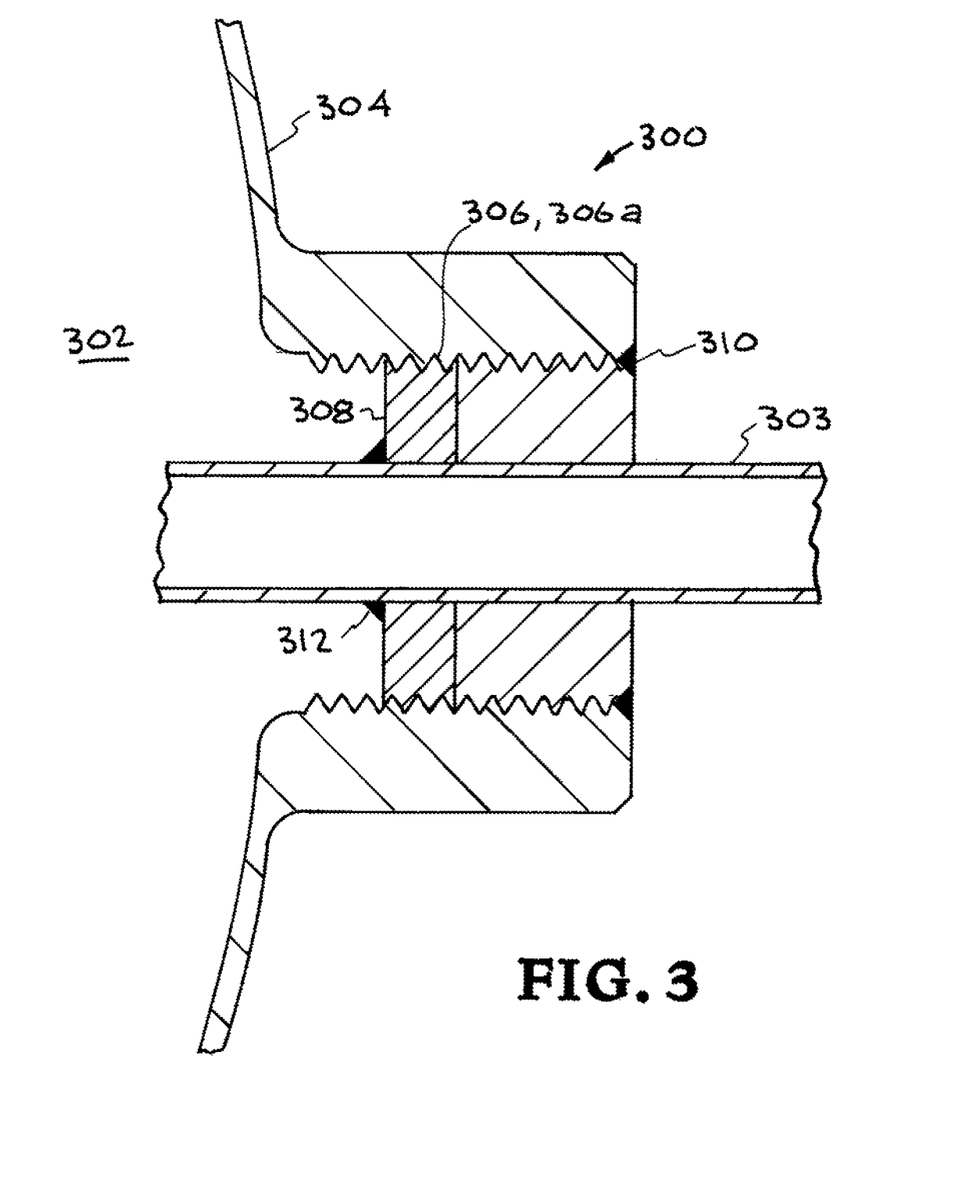
FIG. 3 illustrates another embodiment of a cryogenic-compatible pressure vessel of the present invention.

Referring now to FIG. 3, another embodiment of an insert for a cryogenic-compatible pressure vessel constructed in accordance with the present invention is illustrated. This embodiment of an insert for a cryogenic-compatible pressure vessel is designated generally by the reference numeral 300. The insert 300 provides access into and out of the storage volume 302 of a pressure vessel through tube 303 which serves as both an inlet and an outlet. The tube 303 provides a connection to external components 99 as illustrated in FIG. 1.

FIG. 3 shows the insert 300 threaded into the neck of inner container 304. In this example, threads 306, 306a are formed in the interior of the boss of the vessel 304 and the exterior of the insert 308. The threads 306, 306a withstand the majority of the stress when the fluid inside the tank is pressurized.

The insert component 300 is joined to the inner container 304 through threads 306, 306a and by the weld 310 that extends around the circumference of the insert component as depicted in FIG. 3. The weld 310 provides a seal to contain highly diffusive molecules such as hydrogen that can leak through the threads 306, 306a.

The tube 303 extends through the insert component 308. As shown in FIG. 3 the tube 303 is welded to the insert component 308 by weld 312. The weld 312 extends circumferentially around tube 303. This combination of a threaded body that is joined at the top edge and inner face allows the insert to be used in a tank exposed to the spectrum of cryogenic to ambient temperatures, as well as, high pressure fluids. This design has the advantage of reducing the stress at the joint between the insert and the tank because of the use of threads.

The majority of standard pressure vessels have threaded bosses and can therefore be used with this insert. Additionally, placing the insert inside the neck of the tank is especially advantageous for tanks surrounded by a vacuum jacket or insulation. Use of this insert substantially reduces the volume required to encapsulate the inner pressure container versus a traditional feed through that protrudes out of the container's neck.

Although the description above contains many details and specifics, these should not be construed as limiting the scope of the invention but as merely providing illustrations of some of the presently preferred embodiments of this invention. Other implementations, enhancements and variations can be made based on what is described and illustrated in this patent document. The features of the embodiments described herein may be combined in all possible combinations of methods, apparatus, modules, systems, and computer program products. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described above should not be understood as requiring such separation in all embodiments.

Therefore, it will be appreciated that the scope of the present invention fully encompasses other embodiments which may become obvious to those skilled in the art. In the claims, reference to an element in the singular is not intended to mean "one and only one" unless explicitly so stated, but rather "one or more." All structural and, functional equivalents to the elements of the above-described preferred embodiment that are known to those of ordinary skill in the art are expressly incorporated herein by reference and are intended to be encompassed by the present claims. Moreover, it is not necessary for a device to address each and every problem sought to be solved by the present invention, for it to be encompassed by the present claims. Furthermore, no element or component in the present disclosure is intended to be dedicated to the public regardless of whether the element or component is explicitly recited in the claims. No claim element herein is to be construed under the provisions of 35 U.S.C. 112, sixth paragraph, unless the element is expressly recited using the phrase "means for."

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:
1. An apparatus consisting of:
a pressure container having an interior cavity fabricated from a cavity material and an outer surface spaced away from said interior cavity;
a cryogenic gas in said interior cavity,
external components outside of said pressure container;
an internally threaded opening in said pressure container connecting said interior cavity to said external components, said opening having an end interfacing with said outer surface of said pressure container; and
an insert threaded into said opening;
a weld proximate said end of said internally threaded opening extending circumferentially around said insert, said weld located between said outer surface of said pressure container and said insert providing a seal between said outer surface of said pressure container and said insert;
an inlet port tube connecting the external components with said interior cavity;
an inlet port tube opening in said insert with said inlet port tube positioned in said inlet port tube opening;
a circumferential inlet port tube weld connecting said inlet port tube to said insert that provides a seal between said inlet port tube and said insert;
an outlet port tube connecting said interior cavity with the external components;
an outlet port tube opening in said insert with said outlet port tube positioned in said outlet port tube opening; and
a circumferential outlet port tube weld connecting said outlet port tube to said insert that provides a seal between said outlet port tube and said insert;

wherein said circumferential inlet port tube weld is directly exposed to said cryogenic gas in said interior cavity and said circumferential outlet port tube weld is directly exposed to said cryogenic gas in said interior cavity.

2. The apparatus of claim 1, wherein at least a portion of said insert is fabricated from said cavity material.

3. The apparatus of claim 2, wherein said inlet port tube and said outlet port tube extend through said insert to said inner pressure container.

4. A pressure vessel apparatus for cryogenic capable storage of hydrogen or other cryogenic gases at high pressure and for connection to external components, consisting of:
- a pressure container having an interior cavity and an outer surface spaced away from said interior cavity, said interior cavity made of a cavity material;
- an inlet port tube connecting the external components with said interior cavity;
- an outlet port tube connecting said interior cavity with the external components;
- an internally threaded opening in said pressure container, said internally threaded opening interfacing with said interior cavity and extending to said outer surface of said pressure container;
- an insert adapted to be threadedly secured in said internally threaded opening in said pressure container and positioned to extend to said outer surface of said pressure container,
- a circumferential insert weld connecting said insert to said outer surface of said pressure container that provides a seal between said outer surface of said pressure container and said insert;
- an inlet port tube opening in said insert with said inlet port tube positioned in said inlet port tube opening;
- a circumferential inlet port tube weld connecting said inlet port tube to said insert that provides a seal between said inlet port tube and said insert;
- an outlet port tube opening in said insert with said outlet port tube positioned in said outlet port tube opening; and
- a circumferential outlet port tube weld connecting said outlet port tube to said insert that provides a seal between said outlet port tube and said insert;
- wherein said circumferential inlet port tube weld is directly exposed to said internal cavity of said pressure container and said circumferential outlet port tube weld is directly exposed to said interior cavity of said pressure container.

* * * * *